United States Patent
Cruz-Hernandez et al.

(10) Patent No.: US 9,733,704 B2
(45) Date of Patent: Aug. 15, 2017

(54) USER INTERFACE IMPACT ACTUATOR

(75) Inventors: Juan Manuel Cruz-Hernandez, Montreal (CA); Danny A. Grant, Laval (CA)

(73) Assignee: Immersion Corporation, San Jose, CA (US)

( * ) Notice: Subject to any disclaimer, the term of this patent is extended or adjusted under 35 U.S.C. 154(b) by 1594 days.

(21) Appl. No.: 12/137,857

(22) Filed: Jun. 12, 2008

(65) Prior Publication Data

US 2009/0313542 A1 Dec. 17, 2009

(51) Int. Cl.
*G06F 3/01* (2006.01)
(52) U.S. Cl.
CPC .................. *G06F 3/016* (2013.01)
(58) Field of Classification Search
CPC ....................................... G06F 3/016
USPC ......................... 715/705; 345/156
See application file for complete search history.

(56) References Cited

U.S. PATENT DOCUMENTS

| | | | |
|---|---|---|---|
| 3,913,588 A * | 10/1975 | Klomp | 607/5 |
| 4,672,257 A * | 6/1987 | Oota et al. | 310/328 |
| 4,780,710 A * | 10/1988 | Tatsumi | 715/790 |
| 6,429,846 B2 | 8/2002 | Rosenberg et al. | |
| 6,469,695 B1 * | 10/2002 | White | G06F 3/0488 178/18.01 |
| 6,641,480 B2 | 11/2003 | Murzanski et al. | |
| 7,324,094 B2 * | 1/2008 | Moilanen et al. | 345/173 |
| 2001/0017614 A1 * | 8/2001 | Hara et al. | 345/163 |
| 2002/0067336 A1 * | 6/2002 | Wegmuller et al. | 345/156 |
| 2008/0150905 A1 * | 6/2008 | Grivna | G06F 3/016 345/173 |
| 2009/0207129 A1 * | 8/2009 | Ullrich et al. | 345/156 |

FOREIGN PATENT DOCUMENTS

| | | |
|---|---|---|
| DE | 103 00 469 A1 | 7/2003 |
| JP | 08 221173 A | 8/1996 |
| WO | WO 03/081413 A1 | 10/2003 |

OTHER PUBLICATIONS

Richard Lin "Shape Memory Alloys and Their Applications" last modified on Feb. 22, 2008 6 pages.*
A. David Johnson Shape-memory alloy tactical feedback actuator Aug. 1990 38 pages.*
Leung, R., MacLean, K.E., et al., "Evaluation of Haptically Augmented Touchscreen Gui Elements under Cognitive Load," in Proc. of 9th Int'l Conf on Multimodal Interfaces (ICMI '07), pp. 374-381, 2007.*
Nakatani, M., H. Kajimoto, D. Sekiguchi, N. Kawakami, and S. Tachi. 3D Form Display with Shape Memory Alloy. Proceedings ofICAT'2003. 2003: pp. 179-184.*

(Continued)

*Primary Examiner* — Andrea Long
(74) *Attorney, Agent, or Firm* — Medler Ferro Woodhouse & Mills PLLC

(57) ABSTRACT

A system generates a haptic effect that simulates a mechanical button. The system receives a signal that indicates that a user has contacted a user interface of the system. The system includes an impact actuator. In response to the signal, a moving element of the impact actuator contacts the user interface, which generates the haptic effect.

7 Claims, 4 Drawing Sheets

(56) References Cited

OTHER PUBLICATIONS

Ivan Poupyrev and Shigeaki Maruyama. 2003. Tactile interfaces for small touch screens. In Proceedings of the 16th annual ACM symposium on User interface software and technology (UIST '03). ACM, New York, NY, USA, 217-220. DOI=http://dx.doi.org/10.1145/964696.964721.*

International Search Report and Written Opinion—PCT/US2009/042944, mailed May 26, 2010.

* cited by examiner

USER INTERFACE IMPACT ACTUATOR

FIELD OF THE INVENTION

One embodiment is directed generally to a user interface for a device, and in particular to generating a haptic effect for the user interface.

BACKGROUND INFORMATION

Electronic device manufacturers strive to produce a rich interface for users. Conventional devices use visual and auditory cues to provide feedback to a user. In some interface devices, kinesthetic feedback (such as active and resistive force feedback) and/or tactile feedback (such as vibration, texture, and heat) is also provided to the user, more generally known collectively as "haptic feedback" or "haptic effects". Haptic feedback can provide cues that enhance and simplify the user interface. Specifically, vibration effects, or vibrotactile haptic effects, may be useful in providing cues to users of electronic devices to alert the user to specific events, or provide realistic feedback to create greater sensory immersion within a simulated or virtual environment.

Haptic feedback has also been increasingly incorporated in portable electronic devices, such as cellular telephones, personal digital assistants (PDAs), portable gaming devices, and a variety of other portable electronic devices. For example, some portable gaming applications are capable of vibrating in a manner similar to control devices (e.g., joysticks, etc.) used with larger-scale gaming systems that are configured to provide haptic feedback. Additionally, devices such as cellular telephones and PDAs are capable of providing various alerts to users by way of vibrations. For example, a cellular telephone can alert a user to an incoming telephone call by vibrating. Similarly, a PDA can alert a user to a scheduled calendar item or provide a user with a reminder for a "to do" list item or calendar appointment.

Increasingly, portable devices are moving away from physical buttons in favor of touchscreen-only user interfaces. This shift allows increased flexibility, reduced parts count, and reduced dependence on mechanical buttons that may be more failure-prone due to moving parts, and is in line with emerging trends in product design. A user of a touchscreen or other types of user interface may still desire the familiar touch and feel of mechanical buttons. However, different requirements exist for the haptic actuator for the creation of haptic effects for touch confirmation as opposed to general alerts and ringtones.

SUMMARY OF THE INVENTION

One embodiment is a system that generates a haptic effect that simulates a mechanical button. The system receives a signal that indicates that a user has contacted a user interface of the system. The system includes an impact actuator. In response to the signal, a moving element of the impact actuator contacts the user interface, which generates the haptic effect.

DETAILED DESCRIPTION

One embodiment is a device with a user interface. The device includes an actuator that intermittingly contacts the user interface to create a haptic effect that substantially duplicates the touch and feel of a mechanical button.

Figure 1:
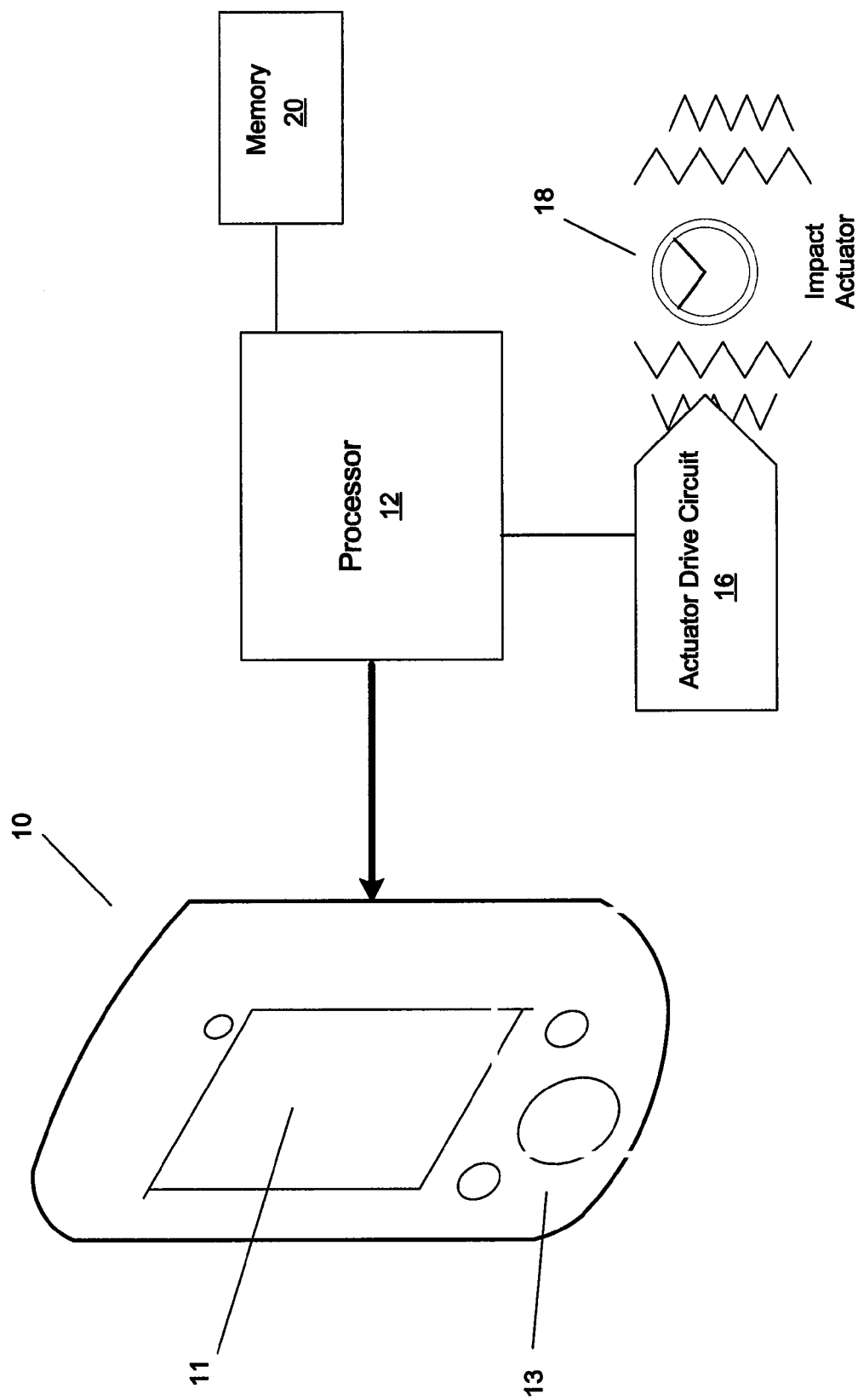
FIG. 1 is a block diagram of a handheld device in accordance with one embodiment.

FIG. 1 is a block diagram of a handheld device 10 in accordance with one embodiment. Device 10 includes a touchscreen 11 or other type of user interface, and may include mechanical keys/buttons 13. Internal to device 10 is a haptic feedback system that generates vibrations on device 10. In one embodiment, the vibrations are generated on touchscreen 11.

The haptic feedback system includes a processor 12. Coupled to processor 12 is a memory 20 and an actuator drive circuit 16, which is coupled to an impact actuator 18. Processor 12 may be any type of general purpose processor, or could be a processor specifically designed to provide haptic effects, such as an application-specific integrated circuit ("ASIC"). Processor 12 may be the same processor that operates the entire device 10, or may be a separate processor. Processor 12 can decide what haptic effects are to be played and the order in which the effects are played based on high level parameters. In general, the high level parameters that define a particular haptic effect include magnitude, frequency and duration. Low level parameters such as streaming motor commands could also be used to determine a particular haptic effect. A haptic effect may be considered "dynamic" if it includes some variation of these parameters when the haptic effect is generated or a variation of these parameters based on a user's interaction.

Processor 12 outputs the control signals to drive circuit 16 which includes electronic components and circuitry used to supply impact actuator 18 with the required electrical current and voltage to cause the desired haptic effects. Impact actuator 18 is a haptic device that generates a vibration on device 10. Impact actuator 18, disclosed in more detail below, can generate a haptic effect having a relatively high frequency and low peak-to-peak acceleration in order to better simulate a mechanical button. Memory device 20 can be any type of storage device or computer-readable medium, such as random access memory ("RAM") or read-only memory ("ROM"). Memory 20 stores instructions executed by processor 12. Memory 20 may also be located internal to processor 12, or any combination of internal and external memory.

Touchscreen 11 recognizes touches, and may also recognize the position and magnitude of touches on a touch sensitive surface. The data corresponding to the touches is sent to processor 12, or another processor within device 10, and processor 12 interprets the touches and in response generates haptic effect signals. Touchscreen 11 may sense touches using any sensing technology, including capacitive sensing, resistive sensing, surface acoustic wave sensing, pressure sensing, optical sensing, etc. Touchscreen 11 may sense multi-touch contacts and may be capable of distinguishing multiple touches that occur at the same time. Touchscreen 11 may further display images for the user to interact with, such as keys, dials, etc., or may be a touchpad with minimal or no images.

Although the embodiment of FIG. 1 is a handheld device, other embodiments may be any type of device that provides a user interface and includes a haptic effect system that includes an impact actuator. The user interface can be a touchscreen, or can be any other type of user interface such as a mouse, touchpad, mini-joystick, scroll wheel, trackball, etc.

User interfaces formed from mechanical buttons provide a naturally occurring feedback to a user. In general, the feedback provided by most mechanical keys is in the form of a single cycle sine wave that includes one up cycle and one down cycle. Some known devices use haptic effects to duplicate the feel of mechanical buttons for other user interfaces such as touchscreens. These known devices typically use actuators to apply a vibrotactile force. The actuators typically used in these devices are Eccentric Rotating Mass ("ERM") actuators, in which an eccentric mass is moved by a motor, or Linear Resonant Actuators ("LRA"s), in which a mass attached to a spring is driven back and forth. However, the vibration effects generated by these actuators in some cases include multiple cycles so they do not do a credible job of simulating mechanical buttons that have a single cycle. Further, these type of actuators typically are not able to easily fit into touchscreen devices that continuously get smaller in size.

Figure 2:
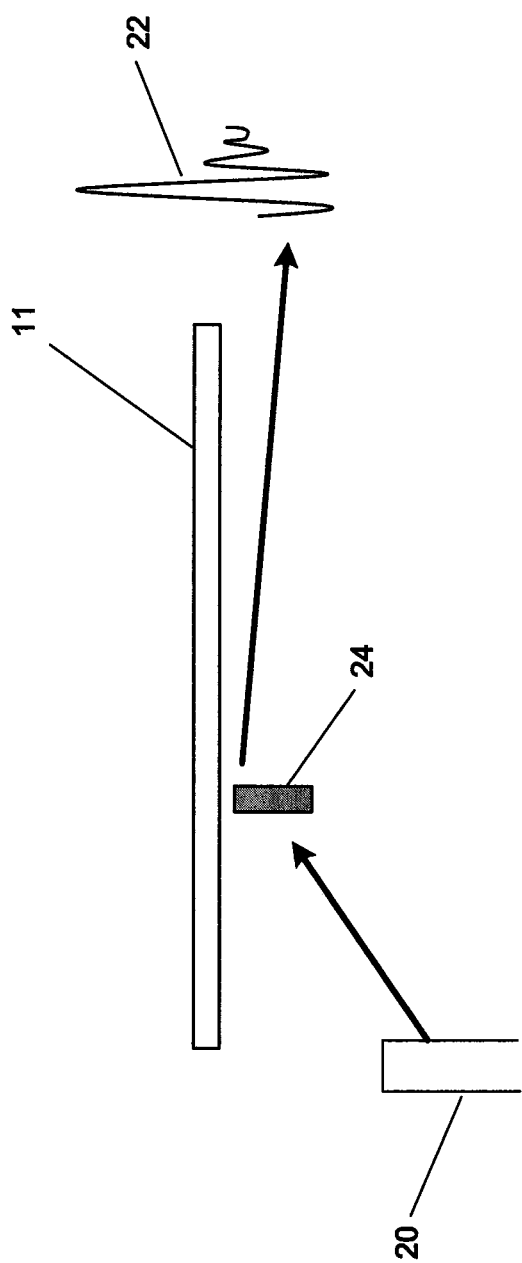
FIG. 2 is a generalized block diagram of an interaction of an impact actuator and a touchscreen in accordance with one embodiment.

FIG. 2 is a generalized block diagram of an interaction of the impact actuator and touchscreen 11 in accordance with one embodiment. A portion of the impact actuator, referred to as a "moving element" 24, contacts touchscreen 11 when an input driving pulse 20 is applied to generate a mechanical impact between moving element 24 and touchscreen 11. In one embodiment, the contact is intermittent in that moving element 24 strikes touchscreen 11 and immediately moves away from touchscreen 11. In another embodiment, the contact can be long term in that moving element 24 strikes touchscreen 11 and remains in contact for a predetermined duration of time. In this embodiment, the sustained contact between moving element 24 and touchscreen 11 quickly dampens out the vibrations. In either embodiment, a vibration waveform 22 that results from the contact is formed substantially of a single waveform that quickly dissipates so that the vibration more realistically simulates a mechanical button.

Figure 3:
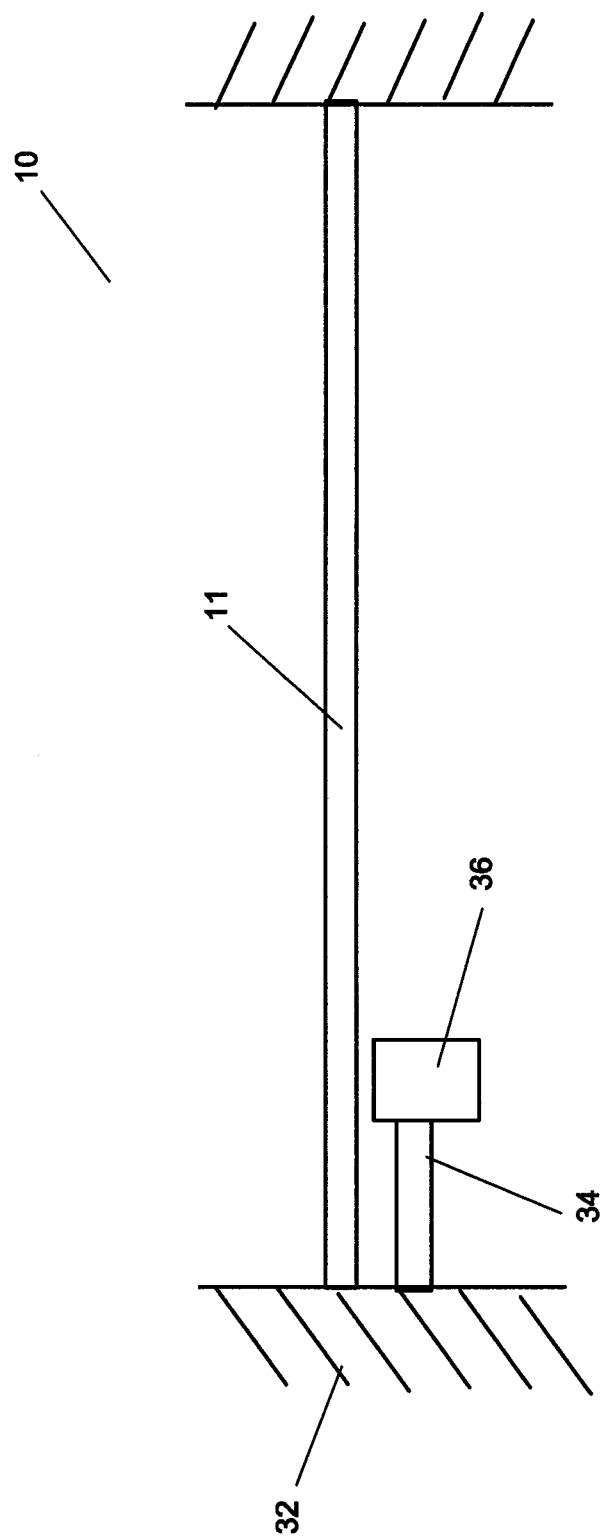
FIG. 3 is a cross-sectional view of the device in accordance with one embodiment.

FIG. 3 is a cross-sectional view of device 10 in accordance with one embodiment. Device 10 includes touchscreen 11 which is coupled and grounded to a housing 32. The impact actuator includes a piezo bender 34 coupled to housing 32 and a rubber mallet 36 coupled to bender 34. In operation, when a pulse signal is applied to piezo bender 34, it curls up and rubber mallet 36, a moving element, strikes or contacts touchscreen 11. As in FIG. 2, the contact can be intermittent or of a longer duration to dampen vibrations. In another embodiment, piezo bender 34 itself is the moving element that contacts touchscreen 11, and rubber mallet 36 is not needed.

Impact actuator 18 in accordance with embodiments of the invention has the following advantages over known actuators that allow it to better simulate a mechanical button or key: (1) It generates faster haptic effects due to the impact nature of the response; (2) It generates a relatively crisp effect due to the nature of the impact frequency; (3) It is adapted for pulse driving so that the actuator does not drive the user interface in a continuous vibration; (4) It is adaptable to be smaller in size because in some embodiments it could be in the form of a strip (e.g., a piezo bender), a small cube (e.g., a stack piezo), or a pin (e.g., a coil with shaft). This allows it to be fit into smaller places and enable applications like thin cellular telephones.

In another embodiment, impact actuator 18 is implemented by a relay that includes a coil plus a moving part that strikes the user interface and includes a spring return. In another embodiment, a shape memory alloy ("SMA") in a relay configuration is used, a direct current ("DC") motor having an arm as the moving element is used, or actuator 18 can be an Electroactive Polymer.

Figure 4:
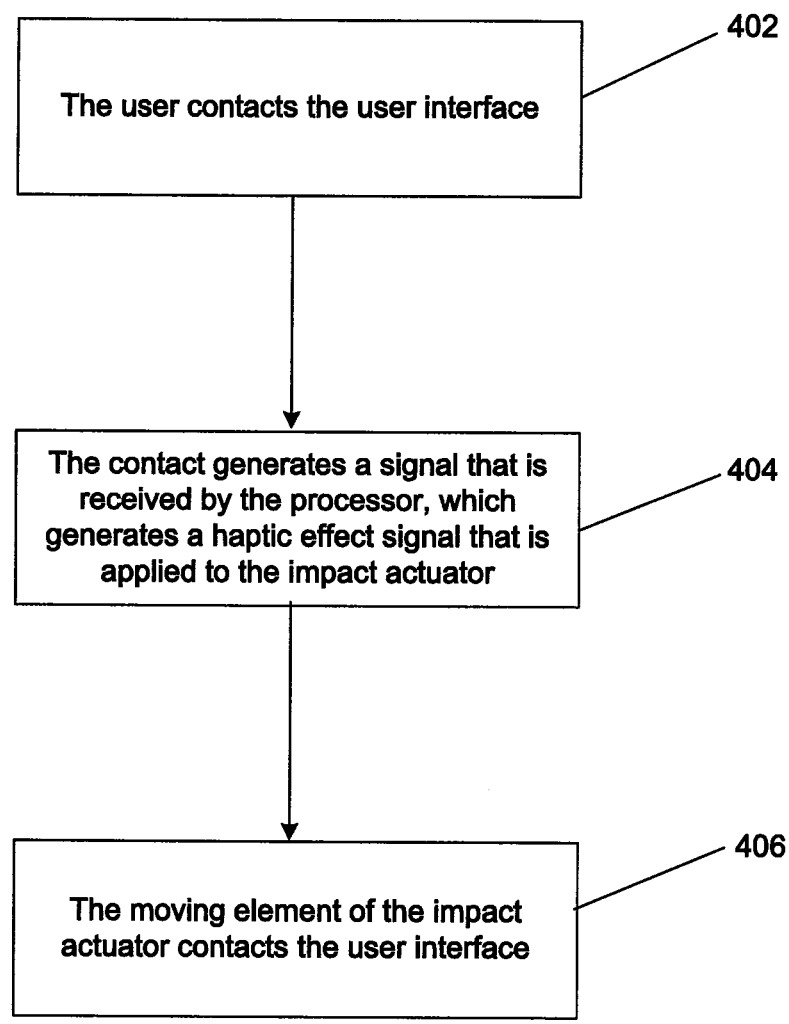
FIG. 4 is a flow diagram of the functionality performed by the device of FIG. 1 in accordance with one embodiment in order to create haptic effects that simulate a mechanical button.

FIG. 4 is a flow diagram of the functionality performed by device 10 of FIG. 1 in accordance with one embodiment in order to create haptic effects that simulate a mechanical button. In one embodiment, the functionality of FIG. 4 can be performed by any combination of hardware and software.

At 402, the user contacts the user interface. The user interface may be a touchscreen or any other type of user interface.

At 404, the contact at 402 generates a signal that is received by processor 12. In response, processor 12 generates a haptic effect signal. In one embodiment, the haptic effect signal includes a driving pulse that is applied to impact actuator 18.

At 406, in response to the haptic effect signal, the moving element of impact actuator 18 contacts the user interface. The contact may be intermittent or last for a predetermined duration.

As disclosed, in one embodiment a device includes a user interface with an impact actuator that has a moving element. The moving element contacts the user interface in response to a user contacting the user interface. The haptic effect that results from the contact by the moving element is similar to the touch and feel of a mechanical button.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of generating a haptic effect simulating a mechanical button, the method comprising:
   sensing a position and magnitude of at least one touch input on a touchscreen of a user interface;
   generating a haptic effect signal based on the touch input with a processor, the haptic effect signal including a driving pulse for an impact actuator having a moving element;
   applying the driving pulse to the impact actuator to cause the moving element to contact the touchscreen and initiate a haptic effect;
   maintaining the contact between the moving element and the touchscreen for a predetermined time duration to dampen the haptic effect based on the maintained contact between the moving element and the touchscreen; and
   discontinuing contact between the moving element and the touchscreen after the predetermined time duration,
   wherein the haptic effect is a vibration waveform resulting from the contact between the moving element and the touchscreen, and
   wherein the vibration waveform consists of a single cycle sine wave that includes one up cycle and one down cycle to simulate the mechanical button.

2. The method of claim 1, wherein the impact actuator comprises a piezo bender, and the moving element is coupled to an end of the piezo bender and is configured to strike the touch screen to initiate the haptic effect.

3. The method of claim 2, wherein the moving element is a rubber mallet coupled to the end of the piezo bender.

4. A device comprising:
- a housing;
- a user interface supported by the housing, the user interface comprising a touchscreen configured to sense a position and magnitude of at least one touch input on the touchscreen;
- a processor coupled to the user interface and configured to generate a haptic effect signal based on the touch input, the haptic effect signal including a driving pulse; and
- an impact actuator coupled to the processor and configured to receive the driving pulse generated by the processor, wherein the impact actuator comprises a moving element configured to contact the touchscreen and initiate a haptic effect simulating a mechanical button upon receipt of the driving pulse;
- wherein the moving element is further configured to maintain the contact with the touchscreen for a predetermined time duration to dampen the haptic effect based on the maintained contact with the touchscreen;
- wherein the moving element is further configured to discontinue the contact with the touchscreen after the predetermined time duration;
- wherein the haptic effect is a vibration waveform resulting from the contact between the moving element and the touchscreen; and
- wherein the vibration waveform consists of a single cycle sine wave which includes one up cycle and one down cycle to simulate the mechanical button.

5. The device of claim 4, wherein the impact actuator comprises a piezo bender, and the moving element is coupled to an end of the piezo bender and is configured to strike the touch screen to initiate the haptic effect.

6. The device of claim 5, wherein the moving element is a rubber mallet coupled to the end of the piezo bender.

7. A device comprising:
- a housing;
- a user interface supported by the housing, the user interface comprising a touchscreen configured to sense a position and magnitude of at least one touch input on the touchscreen;
- a processor coupled to the user interface and configured to generate a haptic effect signal based on the touch input, the haptic effect signal including a driving pulse; and
- an impact actuator coupled to the processor and configured to receive the driving pulse generated by the processor, wherein the impact actuator comprises a moving element configured to contact the touchscreen and initiate a haptic effect simulating a mechanical button upon receipt of the driving pulse;
- wherein the moving element is further configured to maintain the contact with the touchscreen for a predetermined time duration to dampen the haptic effect based on the maintained contact with the touchscreen;
- wherein the moving element is further configured to discontinue the contact with the touchscreen after the predetermined time duration;
- wherein the haptic effect is a vibration waveform resulting from the contact between the moving element and the touchscreen; and
- wherein the impact actuator comprises a piezo bender, and the moving element is coupled to an end of the piezo bender and is configured to strike the touch screen to initiate the haptic effect.

\* \* \* \* \*